United States Patent
Prem

[15] 3,705,317
[45] Dec. 5, 1972

[54] ENERGY CONVERSION SYSTEM UTILIZING EXOTHERMIC REACTIONS

[72] Inventor: Lawrence L. Prem, Tarzana, Calif.
[73] Assignee: North American Rockwell Corporation
[22] Filed: Oct. 4, 1971
[21] Appl. No.: 186,210

[52] U.S. Cl. .................................................. 310/11
[51] Int. Cl. .................................................. H02n 4/02
[58] Field of Search ........................................ 310/11

[56] References Cited
UNITED STATES PATENTS

| | | | |
|---|---|---|---|
| 3,158,764 | 11/1964 | Elliot | 310/11 |
| 3,401,277 | 9/1968 | Larson | 310/11 |
| 3,430,081 | 2/1969 | Zauderer | 310/11 |
| 3,513,336 | 5/1970 | Prem | 310/11 |

*Primary Examiner*—D. X. Sliney
*Attorney*—L. Lee Humphries et al.

[57] ABSTRACT

An energy conversion system utilizing a working fluid having at least two components that are chemically reactive so that desired exothermic reactions can be developed at one or more selected points in the system so that the vapor quality of the working fluid is either increased or maintained.

20 Claims, 7 Drawing Figures

ENERGY CONVERSION SYSTEM UTILIZING EXOTHERMIC REACTIONS

BACKGROUND OF THE INVENTION

A magnetohydrodynamic (MHD) energy conversion system has a MHD generator that converts the kinetic energy of an electrically conductive working fluid into electrical energy by moving the working fluid through a primary or applied magnetic field that is set up across the MHD generator. The interaction of the moving fluid and the primary magnetic field induces an electrical field with current flow in a direction that is mutually perpendicular to both the direction of the fluid motion and the magnetic field. Such a MHD energy conversion system is disclosed in U.S. Letters Pat. No. 3,320,444 issued May 16, 1967 and assigned to the same assignee as the present invention.

Known MHD systems heat a working fluid and partially vaporize the fluid. The thermal energy of the resulting stream of vapor-rich working fluid is converted into kinetic energy by expansion in a nozzle stage. The resulting high-velocity, vapor-rich fluid is a relatively inferior electrical conductor and, therefore, must have its electrical characteristics altered so that the MHD generator "sees" an electrically conductive working fluid. The vapor-rich working fluid has a substantial portion of its vapor fraction condensed by the injection of a liquid, preferably subcooled, that increases the liquid percent of the total volume of the working fluid and decreases the vapor percent volume. This free exchange of thermal energy between the vapor-rich fluid and the injected liquid further results in the transfer of kinetic energy to the injected liquid so that both a high velocity and an electrically conductive working fluid passes through the MHD generator where the kinetic energy is converted into an electrical energy output for an external load.

Although these known MHD systems operate satisfactorily, the overall efficiencies of such systems are reduced for several reasons. The single nozzle stage for expansion results in a desired high-velocity working fluid, but for practical purposes, the velocity is too high for the efficient conversion of the total kinetic energy of the working fluid into electrical energy. It would be desirable, therefore, to have several expansion stages in series. However, the liquid injection, which is necessary so that the MHD generator can "see" an electrically conductive working fluid, substantially reduces the vapor quality of the working fluid so that the desired series of expansion stages become impractical and inefficient.

It is also desirable to reduce thermal losses in energy conversion systems by adding heat energy to the system at selected points in the system and increasing the vapor quality of the system working fluid.

OBJECTS OF THE INVENTION

Accordingly, it is an object of the invention to provide a new and improved energy conversion system selectively maintaining the vapor quality of a working fluid.

It is an object of the invention to provide an energy conversion system that develops exothermic reactions at a selected point or points in the system.

It is an object of the invention to provide an energy conversion system having improved conversion of the total kinetic energy of the system working fluid into electrical energy.

It is an object of the invention to provide an energy conversion system having improved conversion of the total pressure energy of the system working fluid into kinetic energy.

It is an object of the invention to provide a magnetohydrodynamic (MHD) energy conversion system selectively increasing the vapor quality of a working fluid by the addition of heat energy developed in the working fluid.

SUMMARY OF THE INVENTION

Briefly, in accordance with the invention, an energy conversion system is provided having a working fluid with at least first and second separable components that develop an exothermic reaction when recombined. The working fluid passes through a heat source and separator where the first and second components are separated, and the vapor quality of the first component is increased. The second component is selectively recombined with the first component at one or more selected injection points so that any system reduction in vapor quality or any desired pressure increase is increased or developed. The working fluid with its adjusted and controlled vapor quality is introduced into an energy conversion means where the working fluid energy is converted to a selected energy output.

DESCRIPTION OF THE INVENTION

Figure 1:
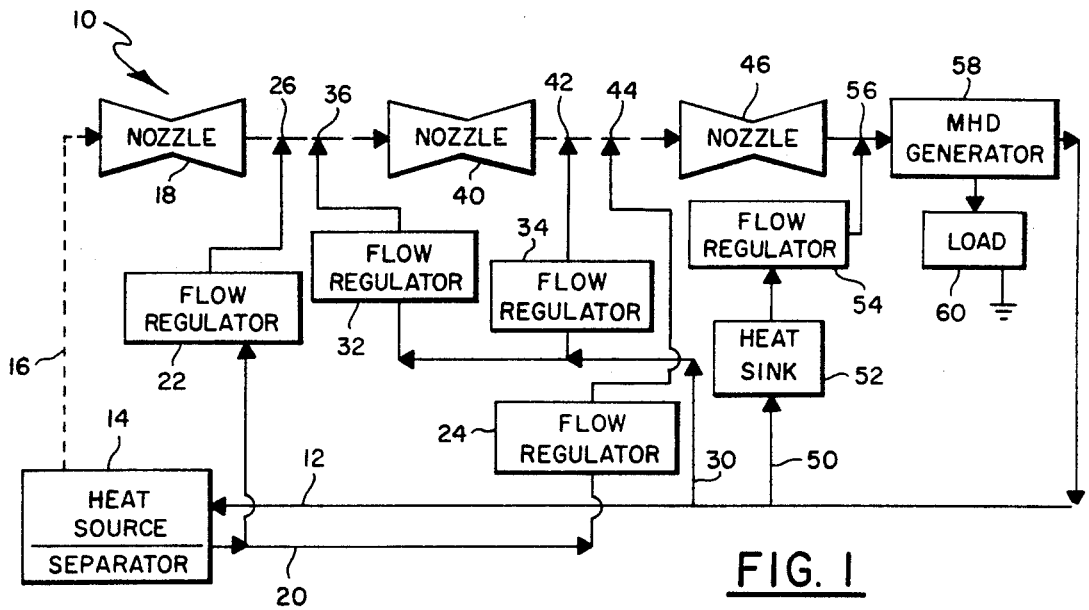
FIG. 1 is a schematic of one form of magnetohydrodynamic (MHD) energy conversion system of the invention.

Referring to FIG. 1, a magnetohydrodynamic (MHD) energy conversion system 10 is illustrated that utilizes a multi-component working fluid having components that are chemically reactive under controlled conditions so that a desired exothermic reaction can be developed at selected points in the MHD system. The controlled addition of thermal energy to the working fluid through exothermic reaction between the components of the fluid maintains the vapor quality of the working fluid stream at a substantially constant value which permits several expansion stages in the MHD system 10 as described hereinafter in more detail.

Figure 2:
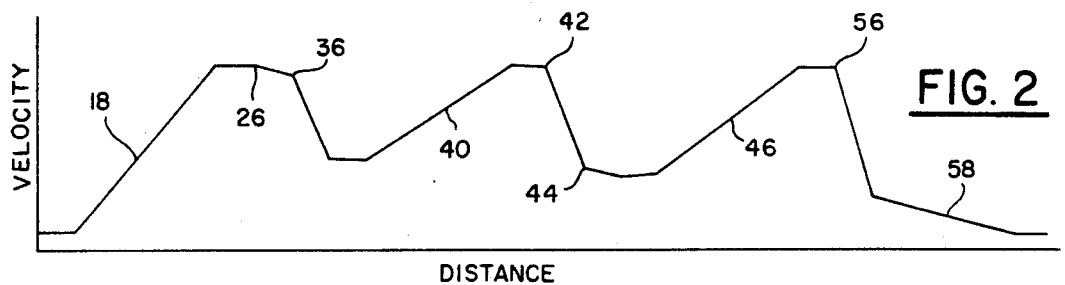
FIG. 2 is a graph of the velocity of one working fluid through a selected portion of the MHD system of FIG. 1.
Figure 3:
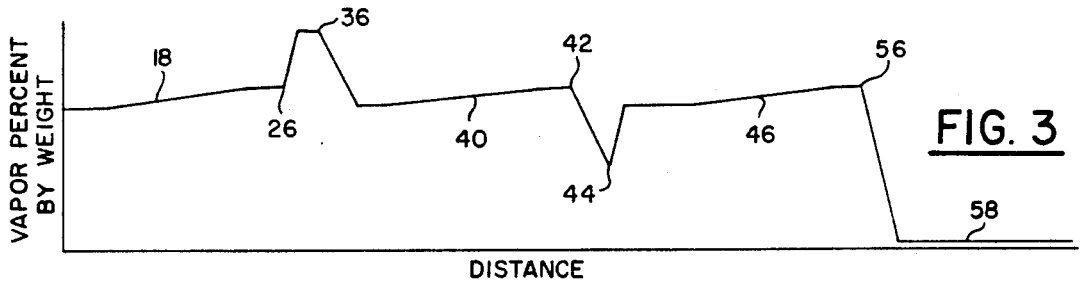
FIG. 3 is a graph of the vapor percent by weight of one working fluid through a selected portion of the MHD system of FIG. 1.

The MHD system 10 of FIG. 1 has a return conduit 12 that passes a working fluid of the system into a conventional heat source and separator unit 14. The working fluid has potassium (K) as a first component and mercury (Hg) as a second component, although it is contemplated that other working fluids having components which develop the desired exothermic reaction can also be used, such as sodium (Na) and potassium. The potassium component of the working fluid is raised to a temperature equal to or greater than the vaporization temperature thereof by the heat source 14 so that the liquid potassium is partially vaporized and becomes a two-phase mixture, i.e., having both liquid and vapor phases. The two-phase working fluid passes as a vapor-rich mixture, as schematically shown by dashed line 16, to a first expansion or nozzle means 18 which increases the kinetic energy of the working fluid by converting the thermal energy of the partially vaporized working fluid into kinetic energy so that an increased velocity, working fluid stream results. A graph of the velocity profile of the MHD system 10 is illustrated by FIG. 2; and see, in particular, velocity portion 18. The mercury component of the working fluid passes from the heat source and separator unit 14 into conduit 20 and is conducted through similar pressure or flow regulators 22 and 24 for the controlled injection into the working fluid stream. The mercury conducted through flow regulator 22 is injected as a controlled quantity downstream of the nozzle means at point 26. The controlled injection of mercury at point 26 results in an exothermic reaction between the injected quantity of mercury and the potassium working fluid stream. The resulting heat generated by the reaction raises the temperature of the injected quantity of mercury and vaporizes a portion of the potassium to elevate the vapor quality of the working fluid stream to a desired and substantially constant value. A graph of the vapor quality profile of the MHD system 10 is illustrated by FIG. 3; and see, in particular, vapor quality point 26.

Figure 4:
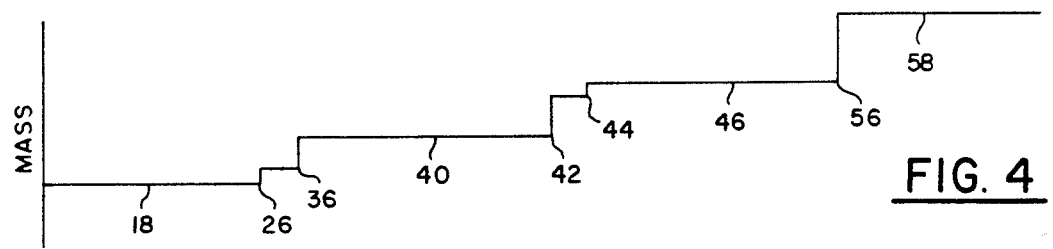
FIG. 4 is a graph of the mass of one working fluid through a selected portion of the MHD system of FIG. 1.

A portion of the working fluid that passes through return conduit 12 is directed through bypass conduit 30 and conducted through similar pressure or flow regulators 32 and 34 for the controlled injection into the working fluid stream at selected points. As described hereinafter, the bypass portion of the working fluid is a liquid or liquid-rich mixture. The bypass portion conducted through flow regulator 32 is injected as a controlled quantity downstream of injection point 26 at bypass injection point 36. In accordance with the general principles of MHD systems such as described in U.S. Pat. No. 3,320,444, a portion of the vapor phase of the working fluid stream is condensed by mass heat transfer with the injected bypass portion (see FIG. 3 and vapor quality point 36) and also that the kinetic energy of the vapor is transferred to the injected bypass portion (see FIG. 2 and velocity point 36); however, the total mass of the working fluid stream is increased. A graph of the mass profile of the working fluid of the MHD system 10 is illustrated by FIG. 4; and see, in particular, mass point 36.

The working fluid stream, which is a vapor-rich mixture because of the controlled injections passes to a second nozzle means 40 which increases the kinetic energy of the working fluid by converting the thermal energy of the vapor-rich working fluid into kinetic energy. An increased velocity, working fluid steam again results (see FIG. 2 and velocity portion 40). The bypass portion of the working fluid conducted through flow regulator 34 is injected as a controlled quantity downstream of the second nozzle means 40 at bypass injection point 42. Again, a portion of the vapor phase of the working fluid stream is condensed by mass heat transfer (see FIG. 3 and vapor quality point 42) while the total mass of the working fluid stream is again increased (see FIG. 4 and mass point 42). The mercury that is conducted through flow regulator 24 is injected as a controlled injection at point 44 downstream of bypass injection point 42. Again, the controlled injection of mercury at point 44 results in an exothermic reaction between the injected quantity of mercury and the predominately potassium working fluid stream. The resulting heat from the exothermic reaction vaporizes a portion of the working fluid and increases the vapor quality of the vapor-rich working fluid stream (see FIG. 3 and vapor point 44).

The resulting working fluid passes to a third nozzle means 46 in the MHD system 10 of FIG. 1 which again increases the kinetic energy of the working fluid by converting the thermal energy of the vapor-rich working fluid into kinetic energy (see FIG. 2 and velocity portion 46).

In the MHD system 10 of FIG. 1, a portion of the working fluid passing through return conduit 12 to the heat source and separator unit 14 is directed through a second bypass conduit 50 to a conventional heat sink 52 which subcools the working fluid to a subcooled liquid state. The subcooled liquid, as a bypass portion, is conducted through a pressure or flow regulator 54 and injected into the working fluid stream at point 56 which is downstream of the third nozzle means 46. This controlled injection of subcooled liquid at point 56 into the vapor-rich working fluid stream alters the electrical characteristics of the working fluid from a relatively inferior electrical conductor (vapor-rich fluid) to a relatively superior electrical conductor (liquid-rich fluid) so that a MHD generator section 58 of the MHD system 10 "sees" an electrically conductive working fluid (see FIG. 3 and vapor quality point 56) to generate an electrical current that passes to an external load 60 which is electrically connected to the MHD generator.

The working fluid stream passes from the MHD generator 58 of the MHD system 10 of FIG. 1 into return conduit 12 and to the heat source and separator unit 14. The working fluid, which is a liquid mixture of potassium and mercury in the MHD system 10 as shown and described, is heated in unit 14 to produce an endothermic reaction, and the potassium and mercury components separated—all in a conventional manner in accordance with known principles. The mercury component then passes into conduit 20 while the vaporized potassium passes into conduit 16 to complete the cycle.

It is contemplated that the injection sequence of mercury and bypass portions of working fluid can be other than as has been described and shown without altering the desirable objectives obtained by the present invention.

Referring again briefly to FIGS. 2, 3 and 4, the MHD system 10 as shown by FIG. 1 develops an average velocity of the working fluid stream that is substantially constant as graphically represented by FIG. 2 while maintaining a substantially constant vapor quality as shown by FIG. 3. Further, the total mass of the working fluid stream is significantly increased from the first nozzle means at 18 to the MHD generator 58 so that the electrical efficiency of the MHD generator is substantially improved over those of the previously known MHD energy conversion systems.

Figure 5:
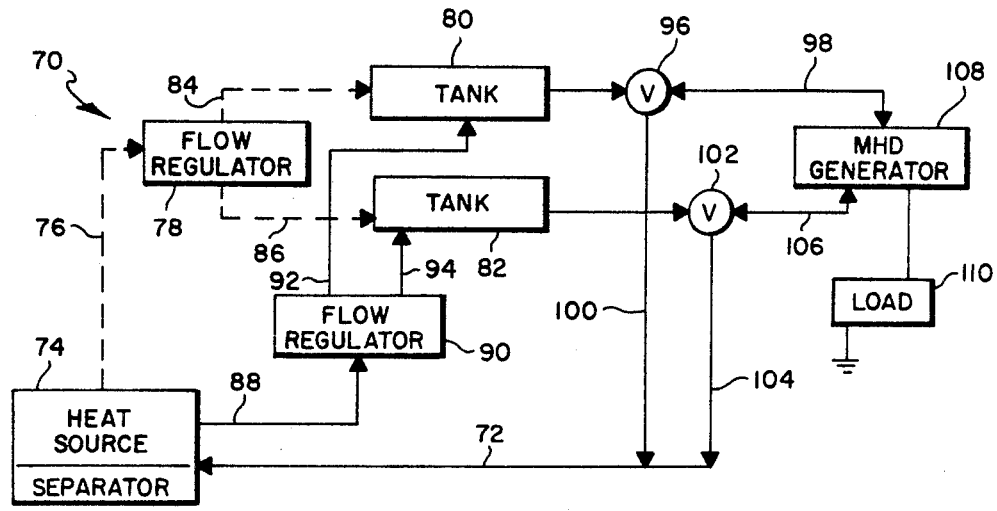
FIG. 5 is a schematic of one form of energy conversion system of the invention.

Referring to FIG. 5, another form of magnetohydrodynamic (MHD) energy conversion system 70 is illustrated that utilizes a working fluid having at least two components that are chemically reactive under controlled conditions so that a desired exothermic reaction can be developed at selected points in the MHD system.

The MHD system 70 of FIG. 5 has a return conduit 72 that passes a working fluid of the system into a conventional heat source and separator unit 74. The working fluid can have potassium (K) as a first component and mercury (Hg) as a second component, although it is contemplated that other working fluids having multicomponents which develop a desired exothermic reaction can also be used.

The potassium component of the working fluid is raised to a temperature equal to or greater than the vaporization temperature of the potassium by the heat source 74 so that the liquid potassium is partially vaporized and becomes a two-phase mixture that has both liquid and vapor phases but which is substantially vapor-rich. The vaporized potassium component of the working fluid passes through conduit 76 to a flow regulator 78 for the controlled and sequential injection into separate tanks 80 and 82 which are connected in parallel by conduits 84 and 86, respectively, with the flow regulator. The mercury component of the working fluid passes through conduit 88 to a flow regulator 90 for the controlled and sequential injection into the tanks 80 and 82 which are connected by conduits 92 and 94, respectively, with the flow regulator 90.

In the MHD system 70 of FIG. 5, the working fluid of the system is selectively and sequentially discharged from the tanks 80 and 82. Tank 80 discharges working fluid through a control valve 96 into either conduit 98 or conduit 100, while tank 82 discharges working fluid through a similar control valve 102 into either conduit 104 or conduit 106. Conduits 98 and 106 connect the respective control valves 96 and 102 to a conventional MHD generator section 108 that is electrically connected to an external load 110. Operatively, the tanks 80 and 82 of the MHD system 70 of FIG. 5 are sequentially charged; however, for purposes of clarity of description, the operating cycle begins with the charging of tank 80. Tank 80 is charged with the vapor-rich potassium working fluid through flow regulator 78, and then a quantity of mercury is injected by flow regulator 90 as a controlled injection into tank 80. The controlled injection of mercury results in an exothermic reaction between the potassium and mercury. The resulting heat that is generated vaporizes the potassium liquid phase and elevates the vapor quality of the working fluid that is confined within tank 80. This results in a pressure increase of the working fluid within tank 80 so that a high velocity working fluid stream discharges through the MHD generator 108 as control valve 96 selectively and sequentially connects the tank 80 to the MHD generator. As control valve 96 discharges tank 80 through the MHD generator 108, control valve 102 selectively bypasses the working fluid stream that passes from the MHD generator through conduit 106 and into conduit 104, and thus into the return conduit 72. Tank 82, which has been charged with the vapor-rich potassium working fluid through flow regulator 78, receives a quantity of mercury as a controlled injection through flow regulator 90. Again, an exothermic reaction occurs and results in a pressure increase of the working fluid within tank 82. When the working fluid stream that discharges from tank 80 through the MHD generator 108 has substantially completed passing through the generator, control valve 102 connects tank 82 to the MHD generator. As control valve 102 discharges tank 82 through the MHD generator 108, control valve 96 selectively bypasses the working fluid stream that passes from the generator through conduit 98 into conduit 100 and thus into the return conduit 72. This sequential cycling between tanks 80 and 82 then repeats as desired. A multiple number of tanks can be used, for example as disclosed in U.S. Letters Pat. No. 3,549,915 issued Dec. 22, 1970, since the MHD system 70 of FIG. 5 schematically represents a portion of a total system. The high velocity working fluid that passes through the MHD generator 108 generates an electrical current for the external load 110. It is contemplated that additional MHD generators can be connected, preferably in parallel, for the passage of the high velocity working fluid that is sequentially discharged from the system tank or tanks.

Figure 6:
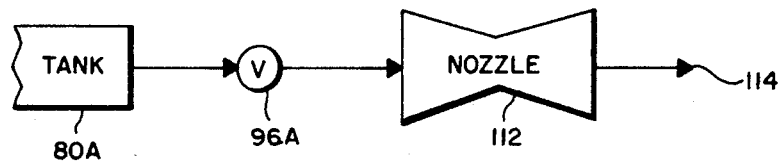
FIG. 6 is a schematic of a portion of another form of energy conversion system of the invention.

The controlled discharge of high velocity working fluid from either tank 80 or 82 of the MHD system 70 of FIG. 5 can also be discharged, as shown by FIG. 6, from tank 80A through control valve 96A to an expansion means such as nozzle 112. The working fluid is discharged from the nozzle 112 to ambient 114 in the open cycle system as illustrated.

Figure 7:
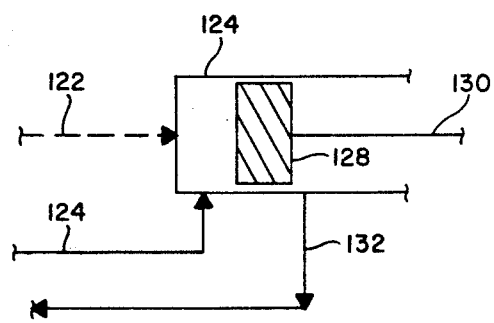
FIG. 7 is a schematic of a portion of another form of energy conversion system of the invention.

One modification of the principle of the MHD energy conversion system 70 of FIG. 5 is shown by FIG. 7. The energy conversion system of FIG. 7 injects the vapor-rich potassium component of the working fluid through conduit 122 into a piston cylinder 124, and the mercury component is sequentially introduced or injected through conduit 126 into the cylinder where the resulting exothermic reaction develops a desired pressure increase within the cylinder. This drives a piston 128 within the cylinder 124 and, in a conventional manner, transmits kinetic energy to a mechanical power system (not shown) through a connecting member 130. The exhaust working fluid discharges through conduit 132 as the piston 128 moves within the cylinder 124.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. An energy conversion system comprising:
   a. working fluid means having at least first and second separable components developing an exothermic reaction when recombined, b. heat source and separator means separating said first and second components of said working fluid means and increasing the vapor quality of said first component, c. injection means connected to said heat source and separator means introducing said second component into said first component so that the exothermic reaction of said first and second components increases the vapor quality and energy level of said working fluid means, and d. energy conversion means receiving said working fluid means and converting the energy of said working fluid means to a selected energy output from the energy conversion system.

2. The energy conversion system of claim 1 in which said working fluid means has potassium and mercury as said separable components.

3. The energy conversion system of claim 2 in which said first component is potassium and said second component is mercury.

4. The energy conversion system of claim 1 in which said working fluid means has potassium and sodium as said separable components.

5. The energy conversion system of claim 1 in which said energy conversion means is a magnetohydrodynamic (MHD) generator having electrical energy as said selected energy output.

6. The energy conversion system of claim 5 in which said energy conversion means further includes constant volume tank means for said exothermic reaction of said first and second components and selected discharge from said tank means to said MHD generator.

7. The energy conversion system of claim 6 in which said constant volume tank means are a plurality of tanks sequentially discharged to said MHD generator.

8. The energy conversion system of claim 7 in which said plurality of tanks are connected in parallel.

9. The energy conversion system of claim 1 in which said energy conversion means is an expansion means discharging said working fluid means to ambient.

10. The energy conversion system of claim 9 in which said expansion means is a nozzle.

11. The energy conversion system of claim 1 in which said energy conversion means is a piston-and-cylinder assembly where a cylinder of said assembly contains said exothermic reaction of said first and second components and a piston of said assembly converts the energy of said working fluid means to a kinetic energy output.

12. The energy conversion system of claim 11 in which said working fluid means passes from said cylinder to said heat source and separator means as a substantially closed-cycle energy conversion system.

13. An energy conversion system comprising:
a. working fluid means having at least first and second separable components developing an exothermic reaction when recombined,
b. heat source and separator means separating said first and second components of said working fluid means and increasing the vapor quality of said first component,
c. first energy conversion means receiving said first component and developing a high velocity working fluid stream,
d. an exit region defined by said first energy conversion means, e. first injection means cooperating with said exit region and introducing a controlled volume of said second component into said high velocity working fluid stream so that the resulting exothermic reaction of said first and second components increases the vapor quality of said working fluid stream, f. second injection means cooperating with said exit region and introducing a controlled volume of said working fluid means into said high velocity working fluid stream so that the mass of said stream is increased, g. second energy conversion means receiving said working fluid stream with increased mass and developing a high velocity working fluid stream, h. third energy conversion means receiving said working fluid stream from said second energy conversion means and defining an entrance region and an exit region, i. third injection means cooperating with said entrance region of said third energy conversion means for the injection of a predetermined volume of working fluid means into said high velocity working fluid stream so that the electrical characteristics of said working fluid stream is increased, j. said third energy conversion means extracting electrical energy from said working fluid stream, and k. conduit means passing said working fluid means from said third energy conversion means to said heat source and separator means.

14. The energy conversion system of claim 13 in which said first and second energy conversion means are first and second nozzles and said third energy conversion means is a magnetohydrodynamic generator.

15. The energy conversion system of claim 14 in which said third injection means includes a heat sink so that said predetermined volume of working fluid is subcooled.

16. The energy conversion system of claim 14 in which said injection means include a flow regulator so that the desired controlled volumes are injected into the working fluid stream.

17. In an energy conversion system, the method of generating electrical energy comprising:
a. increasing the vapor quality of a first component of a working fluid having at least first and second separable components that develop an exothermic reaction when combined,
b. decreasing the vapor quality of said first component by increasing the velocity of said first component working fluid stream,
c. increasing the vapor quality of said working fluid stream by introducing a controlled volume of said second component into said first component working fluid stream,
d. decreasing the vapor quality of said working fluid stream by increasing the velocity of said working fluid stream,
e. altering the electrical characteristics of said working fluid stream by decreasing the vapor quality of the working fluid stream so that the working fluid is electrically conductive, and
f. extracting electrical energy from the electrically conductive working fluid stream.

18. The method of claim 17 in which the vapor quality of the working fluid stream is further decreased by increasing the mass of the working fluid stream.

19. The method of claim 18 in which the mass is increased by injecting a controlled volume of working fluid into the working fluid stream.

20. The method of claim 17 in which the mass is increased and the electrical characteristics of said working fluid stream altered by injecting a controlled volume of subcooled working fluid into the working fluid stream.

* * * * *